Feb. 4, 1969     J. R. REESE     3,425,148

TRANSPARENCY ASSEMBLIES

Filed June 12, 1967

INVENTOR.
JAMES R. REESE

BY
ATTORNEY

United States Patent Office 3,425,148
Patented Feb. 4, 1969

3,425,148
TRANSPARENCY ASSEMBLIES
James R. Reese, 681 N. Valencia, La Habra, Calif. 90631
Filed June 12, 1967, Ser. No. 645,421
U.S. Cl. 40—158  9 Claims
Int. Cl. G09f 1/10, 13/10

ABSTRACT OF THE DISCLOSURE

The specification describes an assemblage of transparencies suitable for use with a transparency projector to display information in enlarged scale. The assembly includes a flat base certain areas of which are transparent and are designated as viewing areas. It also includes a number of overlays which are hinged on the base and have transparent portion that can be positioned over, or not over, the viewing areas of the base. A number of overlays are arranged in sets any number of which can be made to overlie, in any order, a respectively associated viewing area.

---

This invention relates to assemblies of transparencies for displaying coordinated information succesively and in variable order.

The development of light projectors in a form which permits ready access to the space between the light source and the projection lens system has made such projectors very effective tools for instruction.

In using such a device and the transparencies they project, the instructor or lecturer is relieved of most of the work involved in displaying information in large scale. However, the task of preparing the transparencies remains and this presents substantial difficulty when a large volume of information must be presented in alternative arrangements.

One object of the invention is to provide an assembly of transparencies which is capable of overcoming this difficulty in substantial degree.

An example of a requirement for conveying large volumes of information in related but alternative arrangement lies in the drill which is conventionally a part of teaching and learning technical skills, mathematics and foreign languages. While not limited to this application, the invention is advantageously employed in teaching these subjects and it offers particular advantage when employed in teaching foreign language. The provision of a novel aid to such teaching is another object of the invention. In this connection, it is an object to provide a very versatile, easily used, and inexpensive transparency assembly for conducting drill in language instruction.

Another object of the invention is to provide a transparency assembly in which the mechanical arrangement permits display of alternative information in a uniform format. In addition to other advantages, this feature simplifies the making of lesson plans and to enable such simplification is another object of the invention.

Other objects and advantages will be apparent upon examination of the following specification and the accompanying drawings of certain embodiments of the invention, it being understood that various modifications may be made in the embodiments illustrated and that other embodiments are possible within the spirit of the invention.

In the drawings:

FIGURE 1 is a perspective view showing how a projector is employed to display information carried by a transparency assemply embodying the invention;

FIGURE 2 is a top plan view of the transparency assembly shown in FIGURE 1 with all of its overlays disposed over its base;

FIGURE 3 is an isometric view of the assembly of FIGURE 2 showing certain of its overlays positioned off of its base;

FIGURES 4 through 15 are top plan views each showing a different one of the overlays incorporated in the assembly of FIGURE 2; and FIGURES 16, 17 and 18 show alternative forms of a masking sheet for use in the invention.

In FIGURE 1 there is shown a transparency projector 10 and a screen 12. Information in an assembly packet of transparencies 14, resting on the transparent upper face 16 of the projector 10, is shown projected upon the screen 12. That information is projected by light from a source in the base of the projector to a projection head 18 and from there to the screen. The information is displayed in an upper area 20, a central area 21 and a lower area 22 of the screen. The central area is divided into a left-hand, a middle an a right-hand display area.

The assemblage 14 of transparencies comprises a flat rectangular mask designated 23 in FIGURE 18 and shown there to include portions 24, 25 and 26 which are made transparent to correspond with display areas 20, 21 and 22. The transparency package 14 further includes a transparency assembly 15, best shown in FIGURES 2 and 3. This assembly 15 comprises twenty-two overlays designated by the numbers 27–48, respectively. The overlays are attached to the margins of a flat transparent base sheet 49. They are arranged in sets so that one set overlies each of the viewing areas of the assembly 27. Thus, overlays 27, 28, 29, 37, 38 and 39 comprise a set generally designated 50 which overlies the middle portion of the central viewing area corresponding, in the final projection, to the middle portion of display area 21 of the screen 12 and the middle section of transparent area 25 of mask 23. Overlays 30, 31, 32, 33, 35 and 36 comprise a set 51 overlying the right-hand viewing area of the assembly 27 which corresponds to the right-hand portion of the central display area of screen 12 and of transparent area 25 of mask 23. Overlays 40, 41, 42, 43, 44 and 45 comprise a set 52 overlying the left-hand portion of the central viewing area of assembly 27 corresponding to the left-hand portion of the central screen display area and the central transparent area of the mask 23. Overlays 46, 47 and 48 comprise a set overlying a viewing area of assembly 27 corresponding, in the final projection, to display area 20 of screen 12 and to transparent area 24 of the mask. Overlay 34 overlies a viewing area of the assembly 27 corresponding, in the projection, to the display area 22 and to transparent area 26 of the mask.

Portions of overlays 35, 36, 37, 38, 39, 40 and 41 overlie overlay 34. However, they do not comprise a set with overlay 34 for they are not adapted to cooperate with overlay 34 in presenting information for projection into display area 22. A set of overlays is defined as a number of overlays which include portions which overlie a common viewing area. In certain cases exemplified by overlay 34 a set may consist of a single overlay.

Each overlay comprises a flat transparent information bearing portion adapted to overlie its respectively associated viewing area and adapted to be marked with information to be displayed in the corresponding display area of the screen. In addition, each overlay is provided with a stem portion by which the information bearing portion is connected to a point on the margins of the base sheet 49. Advantageously the overlays are formed entirely of transparent material. At least those overlays whose stems may overlie, or underlie, the viewing area of another overlay, must be made of transparent material. Thus, in FIGURE 2 the stem portion of overlays 35, 36, 37, 38, 39, 40 and 41 are shown some to overlie and some to underlie the display area of overlay 34, and must be formed of transparent material.

The stem portions of all of the overlays are shaped such that in the completed assembly each stem leads to a different portion of the margin of the flat base sheet 49. In the embodiment selected for illustration in the drawings the stem portions of the overlays are spaced along all four sides of the rectangular base sheet and this arrangement is advantageously employed.

Each overlay has hinged connection to the base sheet 49 by an individual hinge connecting its stem to the marginal or edge portion of the base sheet. While any suitable hinge structure may be employed, advantageously the hinge is formed by a length of pressure sensitive tape part of which adheres to the margin of the base sheet and the other part of which adheres to the outer end of the stem portion of the respectively associated overlay. This construction is shown in the drawings.

Thus assembled any number of the overlays which comprise a set can be rotated about their respective hinges to lie flat upon the base sheet 49 with their information bearing portion overlying the viewing area of that set. The remaining overlays of any set may be removed from the viewing area of the sheet 49 by rotation about their hinges so that their information bearing portions lie outside the margins of the sheet 49.

FIGURE 3 shows the overlay assembly 15 as it is arranged in the transparency package 14 resting on projector 10 in FIGURE 1. It has its overlay 48 rotated about its hinge to overlie the upper viewing area of the assembly 15 and base sheet 49. Overlay 43, overlay 28 and overlay 32 overlie sheet 49 and its viewing areas at the left, middle and right of the central section, respectively. Overlay 34 is rotated upon its hinge to overlie sheet 49 and the lower viewing area of the assembly. All other overlays have been rotated about their respective hinges so that their information bearing portions do not overlie any of the viewing areas of the assembly. Advantageously the overlays are made of flexible material so that they may be bent to permit arrangement of the overlays in any set in any order. The overlays shown in the drawings are flexible whereby any combination of overlays in a set may be arranged in any order to overlie the viewing area associated with that set.

In practice all of the overlays can, and ordinarily would, bear information which might be projected by a transparency projector such as projector 10. For the sake of clarity, information has been omitted from all of the overlays in all of the figures, except from those overlays which overlie base 49 in FIGURE 3 the information on which is shown projected on the screen in FIGURE 1. The information there shown is the kind that might be employed in teaching students the Spanish language. Information in the upper display area 20 is introductory or in the case shown, defines the grammatical tense of the information displayed below. Information in the lower display area identifies the grammatical rule being illustrated in the central display area 21. The information in that central display area is presented in the form of two sentences. The subject of each of those sentences appears in the left-hand portion of the area. The object of each of those sentences appears in the right-hand portion of the central display area. And, the verb portion of each of the sentences, though incomplete, appears in the middle portion of the central display area. Other overlays of set 53 may be marked with information to establish other tenses and other overlays of set 52 may be marked with other subjects. Other overlays of the set 50 may be marked with other verbs or with information which together with the information marked on overlay 28 will complete a verb. It ill be obvious to those skilled in the art that by appropriate marking of the overlays, a vast amount of information may be presented to students in either correct or incorrect or alternate form to constitute a drill exercise.

Means are provided for marking each overlay wih a symbol or attribute by which it can be readily identified and easily designated in a lesson plan or other plan in which certain but not all of the overlays are arranged to overlie the sheet 49 simultaneously. Advantageously, as shown, this means comprises the marking of indicia on the several hinges. As best shown in FIGURE 2, hinges B4, B5, B6, C6, C5, C4, C3, E1, C2, C1, B3, B2, B1, A6, A5, A4, A3, A2, A1, D3, D2, D1, are associated with the stems of overlays 27, 28, 29, 30, 31, 32, 33, 34, 35, 36, 37, 38, 39, 40, 41, 42, 43, 44, 45, 46, 47, and 48, respectively.

In the event that any overlay is not required for a lesson plan to which an overlay assembly 15 has been devoted, that overlay may be removed together with its hinge. To this end in its preferred modification the hinge is formed from pressure sensitive tape as previously described.

I have determined that special advantages accure for the arrangement of the viewing areas to include an upper, a central, and a lower viewing area and from the arrangement of the central area to include a left-hand, middle, and right-hand viewing area. Not only does this arrangement match the generally preferred catagorization employed in teaching language, mathematics and many technical skills but it is advantageous from a structural standpoint as well. It enables maximum alternative arrangement with minimum interference, minimum material and minimum overlapping of stems. Furthermore, I have determined that the shape of the several overlays shown in the drawings are to be preferred. While other shapes may be employed, the specific shapes shown afford maximum versatility and ease of operation of the invention in that the selection and changing of overlays to alter the information displayed is facilitated. These preferred shapes are shown in FIGURES 4–15. Overlay 34 is shown in FIGURE 4, it comprises an information bearing portion 150 and a stem 151 the hole being formed as an elongated rectangle. Overlay 40 is shown in FIGURE 5 to comprise a generally square information bearing portion 152 and a stem 153 extending laterally from one edge and diagonally to a point opposite the other edge of one side to form a shape generally like the numeral 7. Overlay 39 is shown in FIGURE 6 to comprise a generally square information bearing portion 54 and a stem 55 which extends laterally from one edge diagonally to one side and is tapered to become narrower at the outer end of the stem. Overlays 37, 36, 29 and 30 have this same shape except tht overlays 37 and 36 are reversed. Overlay 28 is shown in FIGURE 7. It comprises a generally square information bearing portion 56 and a stem 57 which extends from one side and is tapered so that it is narrower at its outer end. Overlay 38 has the same shape as overlay 28. Overlay 27 is shown in FIGURE 8. It comprises a generally rectangular information bearing portion 58 and a stem 59 which tapers to become narrower at its outer end and which extends directly laterally from portion 58 at its inner end and off at a "dog-leg" or transverse angle at its outer end. Overlay 29 has the same shape as overlay 27 except that it is reversed. Overlay 31 is shown in FIGURE 9. It comprises a square information bearing area 60 and a stem 61 extending from one side laterally at an angle and tapering toward an end portion that is turned ninety degrees from the side of the square portion 50 from which the stem 61 extends. Overlay 35 is reversed but otherwise has the same shape as overlay 31. Overlay 33 is shown in FIGURE 10 to comprise a square information bearing portion 62 connected at one edge to a short tapered stem 63. Overlay 45 is shown in FIGURE 11. It comprises a square information bearing portion 64 and a stem 65 having the shape of a parallelogram and extending from one edge of portion 64. Overlays 41 and 32 are similarly shaped. Overlay 42 has the same shape except that it is reversed. Overlay 44 is shown in FIGURE 12 to comprise a square information bearing portion 66 and a rectangularly shaped stem 67 extending from one end of one edge of the portion 66. Overlay 43 has the same shape except that it is reversed. Overlay 46 comprises a rectangular information bearing portion 68 and a stem 69 shaped as a parallelogram and extending from one narrow side of portion 68. Overlay 47 is shown in FIGURE 14 to comprise a rectangular information bearing portion 70 and a stem 71 in the shape of a parallelogram extending from one end of one wide side of the portion 70. Overlay 48 is shown in FIGURE 15 to comprise a rectangular portion 72 adapted to be marked with information to be displayed and it comprises a stem 73 having the shape of an irregular trapezoid and extending from one of the wide sides of portion 72.

Except for the information marked on its hinges and on its several overlays, the overlay assembly 15 is made entirely of transparent material. To mark and to separate the several display areas on the screen 12 the mask 23 was included as one of the elements in the transparency package 14. All but the viewing areas of the mask are opaque. In the embodiment selected for illustration, those portions of the mask 23 which have been shaded in the drawing to indicate that they are green, are opaque. In this embodiment the transparent areas have been created by forming them of transparent material. Alternatively, the transparent portions of the mask can be formed by cutting away part of an opaque sheet from which the mask is formed. In certain applications of the invention it will be desired to eliminate the display area 20. To this end the mask 74 shown in FIGURE 17 is provided. It has transparent areas 75 and 76 which in the final projection correspond to display areas 21 and 22 on the screen 12. Sometimes it is desirable to eliminate all but the three viewing areas of the central portion of the overlay assembly. The mask 77 shown in FIGURE 16 will accomplish that purpose. It has a single transparent area 78 which corresponds, in the final projection, to display area 21 to which is projected information appearing on overlays in sets 50, 51 and 52.

It will be apparent to those skilled in the art that the invention provides a very versatile and efficient aid to instruction which lends itself to premade lesson plan presentation without loss of the ability to deviate from the plan where special assistance or emphasis is required.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. A transparency assembly for displaying coordinated information comprising:
    (a) a flat transparent base sheet comprising a plurality of viewing areas,
    (b) a plurality of overlay sets corresponding respectively to one of said viewing areas, each set including a plurality of transparent overlays capable of bearing information and each overlay of a set having a portion shaped like the viewing area of the base to which its set corresponds, connection means comprising a hinged connection between each overlay and a respectively associated marginal portion of said base sheet for enabling placement of any combination of the transparencies of any set to overlie the viewing area of the base sheet corresponding to said set.
2. The invention defined in claim 1 in which said viewing areas are formed in a row.
3. The invention defined in claim 1 including a multiple area overlay capable of bearing information and shaped to overlie at least two viewing areas of said base sheet, and means including hinged connection between said multiple area overlay and said base sheet for enabling placement of said transparency over said two viewing areas.
4. The invention defined in claim 3 including means independent of the information carried by said overlay in the portion shaped like the viewing area of the base which it can overlie for distinguishing each overlay from all of the others of the assembly.
5. The invention defined in claim 1 in which said viewing areas comprise three viewing areas arranged in a row and the set of overlays corresponding to the middle one of said three viewing areas comprising at least three overlays two of which have hinged connection to said base at one side of said row and the other of which has hinged connection to the opposite side of said row.
6. The invention defined in claim 1 in which said viewing area occupy less than the whole transparent area of said base and in which said connection means, in the case of at least one of said overlays, includes a flat transparent connection between the hinged connection of that one overlay and said portion of said one overlay capable of placement over a viewing area of the base, when so placed, such that said flat transparent connection overlies another viewing area of said base, and which further comprises another overlay and means comprising hinged connection between said other overlay and an edge portion of said base sheet by which said other overlay may be positioned in overlying relation to said other viewing area of said base.
7. The invention defined in claim 1 including means in the form of a mask adapted for assembly with said base sheet for precluding projection of light through said assembly except through said viewing areas.
8. The invention defined in claim 1 in which said overlays comprise flexible material.
9. The invention defined in claim 1 in which said viewing areas comprise three areas of said base sheet arranged in a row and a fourth area in the region between said row and one side edge of said sheet, said plurality of overlay sets comprising one corresponding to each viewing area, the sets corresponding to each of said three areas comprising at least three overlays, and the connecting means associated with the overlays of each set connecting at least one overlay of the set to a margin of said base on a side which is different than the side including the margin to which another overlay of said set has hinged connection, the connecting means for at least one of the overlays of one of said three sets of overlays including a flat transparent portion movable to a position overlying said fourth area.

References Cited
UNITED STATES PATENTS
2,776,594  1/1957  Garity _____ 40—106.1 X
3,264,767  8/1966  Coffman _____ 40—102
3,279,109  10/1966  Whittum _____ 40—106.1

JEROME SCHNALL, Primary Examiner.
W. J. CONTRERAS, Assistant Examiner.

U.S. Cl. X.R.
40—106.1